United States Patent
Dillon

[15] 3,670,365
[45] June 20, 1972

[54] SYNCHRONIZED PIN POINT SPRAY FLUID APPLICATOR

[72] Inventor: Janus J. Dillon, Irving, Tex.

[73] Assignee: Food Equipment, Inc., Dallas, Tex.

[22] Filed: June 15, 1970

[21] Appl. No.: 46,263

[52] U.S. Cl. .................................................17/11.2, 17/52
[51] Int. Cl. ................................................................A22c 21/04
[58] Field of Search ...................17/11.2, 15, 1, 52; 239/559, 239/567

[56] References Cited

UNITED STATES PATENTS 2,132,634   10/1938   Kurt ....................................17/1 R X
2,766,065   10/1956   Joyslen ............................239/DIG. 1

Primary Examiner—Lucie H. Laudenslager
Attorney—Richards, Harris & Hubbard

[57] ABSTRACT

In a vaporizing spray system for the treatment of slaughtered animals, a synchronized fluid applicator is located at a curved portion or turning point of a conveyor utilized therewith. The fluid applicator has spaced nozzles for delivering a fluid stream upon a preselected localized portion of an animal carried by the conveyor. The nozzles are mounted, preferably in a circular pattern, and synchronized with the motion of the conveyor to travel along the path of the animal being conveyed around the curved portion of the path, thus applying a fluid such as steam to a portion of the animal.

12 Claims, 4 Drawing Figures

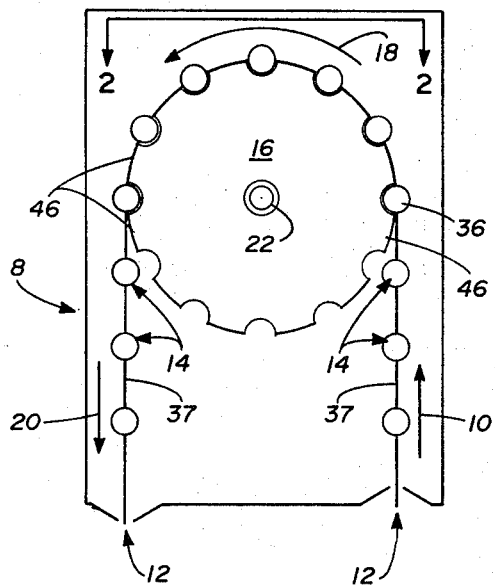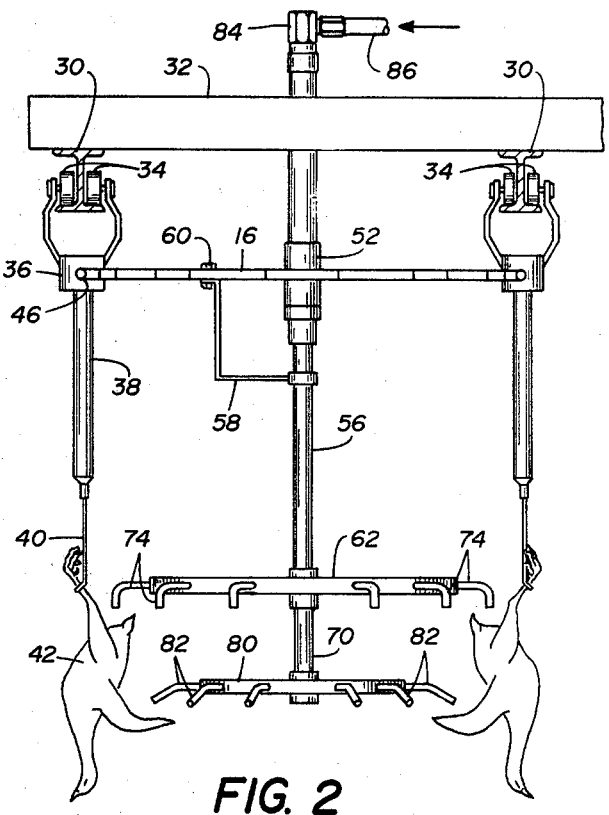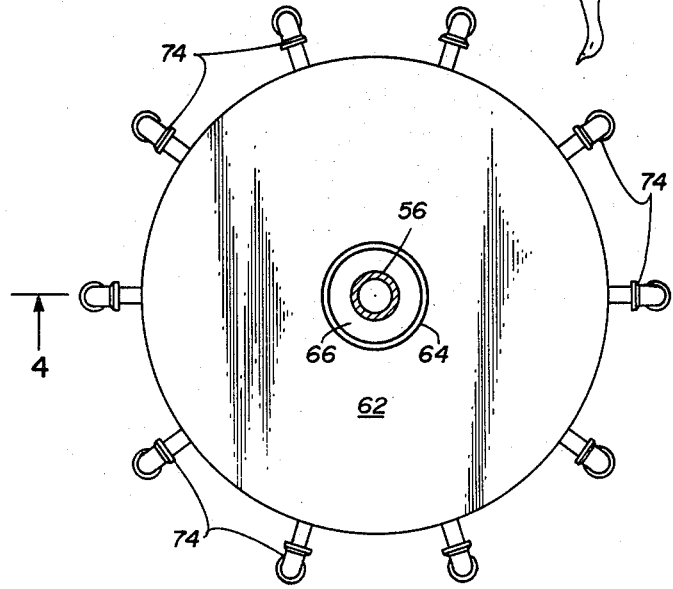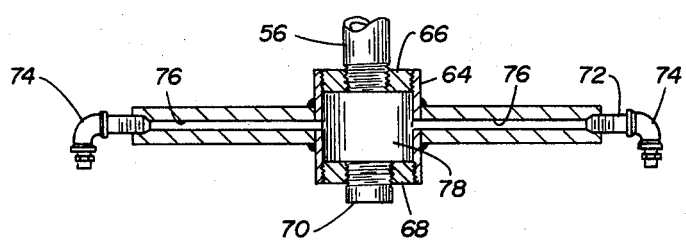
FIG. 1
FIG. 2
FIG. 3
FIG. 4
INVENTOR:
JANUS J. DILLON
Richards, Harris & Hubbard
ATTORNEYS

SYNCHRONIZED PIN POINT SPRAY FLUID APPLICATOR

BACKGROUND OF THE INVENTION

This invention relates to an improvement in a system for processing animals after their slaughter, and particularly to an apparatus for applying a fluid stream to a preselected localized portion of the animal as it travels through the processing system.

A common technique for the treatment of animals, and especially fowl, in order to loosen the feathers thereon preparatory to mechanical defeathering, has included hanging the fowl from shackles and dragging them through one or more tanks of hot scalding water. These techniques are subject to numerous disadvantages including contamination by accumulated dirt, bacteria and residue from the previous processed fowl. Despite repeated cleaning of such tanks, the control of bacteria such as Salmonella has been ineffective, since the water in the tanks must generally be kept below temperatures of about 140° F. to avoid cooking the fowl. As the fowl passes through these hot water tanks, ingestion of contaminated water by the fowl occurs, leaving bacteria on the skin of the fowl which is subsequently driven into its meat by the mechanical defeathering mechanisms.

Heretofore, the utilization of steam for the treatment of animal carcasses, and particularly fowl, have been proposed. Various patents including U.S. Pat. Nos. 2,152,082 and 2,152,083 disclose the use of hot fluid streams, for example, steam or hot water, upon the fowl. Fowl defeathering apparatus is also disclosed in U.S. Pat. Nos. 2,972,167 and 3,074,103. Although steam treatments as disclosed in the latter two patents have presented the industry with more sanitary feather-loosening processes over standard emersion techniques, the particular constructions and techniques disclosed have not been accepted in the fowl processing trade because they require substantial modification of existing fowl processing facilities.

Substantial improvements in steam processing techniques have recently been made. The improvements are disclosed in three co-pending applications assigned to the assignee hereof. These applications include Ser. No. 749,804, filed Aug. 2, 1968, to Folke K. Flowden, now U.S. Pat. No. 3,561,040; Ser. No. 831,964, filed June 10, 1969, to Bryan T. Snowden, now U.S. Pat. No. 3,631,563; and an application entitled Improved Vaporizing Technique for Treatment of Animal Carcasses to Bryan T. Snowden, Ser. No. 13,604, filed Feb. 24, 1970. These applications generally disclose vaporizing spray systems for treating slaughtered animals, and particularly for the processing of fowl.

The processing systems and apparatus disclosed therein all utilize conveyor systems in which the slaughtered animals are carried by shackles. The conveyors carrying the shackles traverse a housing at least twice and in some cases more, thus, of course, requiring a reversal or change of direction along the conveyor route. Conveyors as used and disclosed are conventional and are commercially available. These conveyors include turn wheels or turn-around wheels which assist the continuous conveyor system in rounding a corner along the path of travel. The disclosed techniques all include the application of a fluid to the animal carcass, particularly to fowl, at various points along the path of the conveyor in the housing.

It has been found that a stationary applicator for fluid is generally sufficient to apply a desired fluid such as steam to the fowl to facilitate feather removal. Some areas or portions of the body of the fowl, however, do not receive sufficient fluid to loosen the feathers. These areas include the straddle area of the fowl, the area between and surrounding the legs of the fowl, and the portions of the fowl near where the wing is connected to the body. The problem then has been one of applying a fluid to these localized portions of the body of the fowl. Stationary fluid nozzles cannot supply a satisfactory amount of fluid to the localized portions since the fowl, of course, is always being moved by the conveyor system. The localized portion does not remain in the fluid streams for a long enough period of time to sufficiently saturate these areas with fluid. If one attempts to increase the flow of fluid from stationary nozzles to a point reaching a satisfactory level of fluid application, the temperatures in the housing and in the areas surrounding the high flow stationary nozzles becomes too hot, thus retreating to the problem of premature cooking of the fowl.

SUMMARY OF THE INVENTION

This invention, therefore, provides a system and apparatus by which a fluid applicator applies fluid to a localized portion of an animal while moving at a synchronized rate in a path corresponding to the path of travel of the fowl as dictated by the conveyor. The present invention specifically provides an animal processing system including an animal conveyor on which animals travel at spaced intervals having a curved portion therein for altering the direction of travel of the conveyor, an improvement comprising a continuous displaceable member mounted for travel about a predetermined circuit positioned at the curved portion and having a plurality of nozzles thereon separated by distances corresponding to the spaced intervals, conduit means for supplying a fluid to the nozzles and means for synchronizing the displacement of the nozzles with the location of animals on the conveyor. These nozzles, of course, preferably direct a fluid spray on a preselected localized portion of the animal being processed. The apparatus of the present invention can include at least one nozzle corresponding to each of the spaced intervals. The apparatus can also include a plurality of nozzles corresponding to each of the spaced intervals positioned to direct fluid sprays or streams on a plurality of preselected localized portions of the animals. The nozzles can be arranged in a circular array or in other arrangements suitable and compatible with the animal processing system.

BRIEF DESCRIPTION OF THE DRAWINGS

The present invention will be more easily understood by those of ordinary skill in the art if reference is made to ensuing specification and accompanying drawings wherein:

FIG. 1 is a schematic illustration of a location along a curved portion of the conveyor system at which the apparatus of the present invention can be located;

FIG. 2 is an elevation view similar to one which is taken along Section line 2—2 of FIG. 1 of the apparatus of the present invention in which the curved portion of the conveyor itself is broken away for clarity;

FIG. 3 is a top view of a preferred spray nozzle arrangement for use with the present invention;

FIG. 4 is a cross-sectional view of the nozzle arrangement of FIG. 3 taken along section line 4—4.

DESCRIPTION OF PREFERRED EMBODIMENTS

The synchronized pin point spray fluid applicator of the present invention is generally employed along a curved portion of the conveyor in a housing utilized for the vaporizing technique of processing animal carcasses. A section of such a conveyor path is schematically illustrated in FIG. 1. The conveyor is enclosed by covered housing 8. The conveyor depicted by line 12 has a plurality of interconnected pull blocks 14 arranged at spaced intervals along the conveyor path. The conveyor initially is traveling in a direction generally designated by arrow 10. Shackles for holding animal carcasses are suspended from the pull blocks. The pull blocks 14 are mounted on a rail having the general curvature of conveyor path 12, a turn-around wheel 16 is usually employed to assist the conveyor in reversing direction or executing a corner such as indicated by arrow 18. The turn wheel 16 is mounted for rotation on a shaft 22. Shaft 22 is normally connected to the frame or housing of the processing system. After completing a 180° turn, the conveyor path then proceeds in the direction from whence it came along the path generally indicated by arrow 20. It is to be understood that depending upon the particular arrangement of the conveyor path, the magnitude of path alteration can be 180° as shown, slightly more than 180°, or less than 180°, such as a 90° turn. The fluid applicator of the present invention can be utilized with any configuration normally encountered in fowl processing systems.

The present invention is more clearly set forth in FIG. 2, which is an elevation view of a conveyor mechanism at a curved portion in its path at which it completes a reversal of direction. Such a view would be obtained if the schematic illustration of FIG. 1 were viewed along section line 2—2. The conveyor illustrated in FIG. 2 includes I-rails 30 connected to a frame member 32. Mounted in the channels of the I-rails 30 are opposing rollers 34 which are rotatably mounted on a pull block 36. The pull block 36 has attached thereto a drop rod 38 onto which shackles 40 are connected. An animal 42 is held by the shackle 40 in a predetermined position relative to the direction of travel of the conveyor mechanism. Pull blocks 36 are arranged at spaced horizontal intervals along rails 30. The pull blocks are interconnected by suitable linking members such as a link chain, steel cable or the like. For clarity, the curved portion of the conveyor system has been broken away to expose the turn and nozzle wheels.

As the pull blocks 36 round a corner such as the exemplary 180° turn shown herein, the force vectors exerted by the interconnecting links 37 between the pull blocks combine to pull the blocks radially inward. This action is undesirable. A turnaround wheel 16 is conventially employed to prevent the radially inward displacement of the pull blocks as they round a corner in the conveyor path. These turn-around wheels or turn wheels can be likened to large gears, the teeth of which intermesh with the pull blocks to assist them around a corner and to resist the inward forces exerted on the blocks. Turn wheel 16 is shown engaging pull block 36 with tooth 46. (See FIG. 1 for a top view thereof.) Thus the movement of the conveyor rotates the turn wheel 16.

In this embodiment of the present invention, the turn wheel 16 is journaled via a bearing 52 on hollow shaft 22 which is in turn securely fastened to frame member 32. The channel in hollow shaft 22 continues through the frame member 32 opening onto the top thereof. Concentrically mounted within the hollow shaft is a conduit 56. Conduit 56 is supported by rigid bracket 58 which is in turn connected to the turn wheel 16 by bolt 60. It should be noted that once the orientation of the shaft 56 with respect to the turn-around wheel is established, the bracket 58 can be securely fastened to the conduit 56, for example, by welding.

Attached to the conduit 56 is a spray nozzle wheel 62, the construction of which will be better understood by reference to FIGS. 3 and 4, illustrating a plan view of the nozzle wheel and a cross-sectional elevation view along the section line 4—4, respectively. Referring jointly to the latter figures, the nozzle wheel 62 has an opening in the center thereof into which is inserted cylindrical casing 64. Casing 64 at the top end thereof has screwably inserted therein a coupling 66 which is in turn screwably attached to conduit 56. The bottom portion of casing 64 also contains a coupling 68 into which can be inserted a plug (not shown) or a second conduit 70 for connection to another nozzle wheel.

The wheel 62 has located around its periphery a plurality of threaded holes 72 into which are screwed nozzle fixtures 74. The nozzles 74 are spaced at distances around the periphery of the wheel 62 which correspond to the spaced intervals of the pull blocks 14 (FIG. 1). Thus the nozzle locations can be synchronized with conveyor movement and directed to a predetermined portion of the animal. Channels 76 communicate between nozzles 74 and chamber 78 formed by casing 64 and coupling 66. A fluid supplied from conduit 56 will thereby enter chamber 78, pass through channels 76 and issue from the nozzles. If desired, fluid can also pass through conduit 70 from chamber 78 and be distributed to the nozzles of a second nozzle wheel 80.

Referring again to FIG. 2, the nozzles 74 of wheel 62 are positioned so as to direct a stream or spray of fluid to a localized portion of the body of the animal being processed, such as the straddle area of fowl as illustrated. If desired, the second nozzle wheel 80, connected to the first nozzle wheel 62 by conduit 70, can be employed to direct fluid streams to other localized areas of the fowl. As illustrated, the nozzle 82 of nozzle wheel 80 is capable of directing a spray or stream of fluid to the area surrounding the connection of the wings of the fowl to the body.

Fluid is supplied to the nozzle wheels by a conduit 56 which has attached to its upper end a coupling 84. Fluid is supplied to the coupling via line 86 from a source of fluid. The coupling 84 is stationary and contains a seal member to allow conduit 56 to rotate therein while supplying fluid to the interior of the conduit but preventing leakage or escape of fluid therefrom. The type of fluid which can be employed with the present invention is normally and preferably steam as applied to fowl. Hot water can also be used if desired as well as various other fluids depending upon the particular application.

As is readily seen by one of ordinary skill in the animal processing art, the present invention provides a solution to the problems which have been encountered in the prior art. The present invention provides a means by which localized areas of an animal can be treated with a fluid to facilitate processing of the animal into a usable and edible commodity. This invention is easily adaptable to use with various types of animals, but is particularly useful for the processing of fowl prior to defeathering.

Other variations and modifications of the present invention will be readily comprehended by those of ordinary skill. The present invention has been described in relation to a preferred embodiment, however, it is not limited to the disclosed embodiment. For example, the spray nozzles of this invention can be mounted on a continuous flexible chain member and connected to a fluid source by flexible conduits. Such an arrangement will allow practice of the present invention where a noncircular conveyor path curvature is encountered. The invention is intended to be defined and limited only by the appended claims.

What is claimed is:

1. In an animal processing apparatus including a conveyor having curved portions therein for changing its direction of travel, a rotatable turn wheel mounted at said curved portions to counteract radial forces and assist the travel of the conveyor through said curved portions, shackles mounted at spaced intervals on said conveyor for securing an animal in a predetermined position with respect to the direction of travel of said conveyor, said turn wheel angularly displaced at a rate proportional to the travel of said conveyor, the improvement comprising:

a circular plate having a chamber in the center thereof, said plate rotatably mounted in dependence upon the rotation of said turn wheel, said plate further including fluid passages communicating with said chamber and terminating at the periphery of said plate in nozzles at locations corresponding to said spaced intervals, said nozzles being positioned to direct a stream of fluid on a predetermined localized portion of an animal secured in said shackles, and means for supplying a fluid to said fluid passages.

2. The apparatus of claim 1 wherein a single nozzle corresponds to each of said spaced intervals.

3. The apparatus of claim 1 wherein a plurality of nozzles are positioned at each of said spaced intervals, each of said plurality of nozzles positioned to direct a stream of fluid on a different localized portion of an animal secured in said shackles.

4. The apparatus of claim 1 wherein the apparatus further includes a hollow shaft on which said turn wheel is journaled, said means comprising:

a conduit connected at one end to said circular plate, the interior of which communicates with said chamber, said conduit extending through said hollow shaft to a point on the opposite side of said wheel, and coupling means attached to said shaft at said point for connecting said conduit to a source of fluid.

5. The apparatus of claim 4 further comprising a bracket connected to said wheel and said conduit for rotating said conduit in response to the rotation of said wheel, thereby rotating said plate.

6. The apparatus of claim 5 wherein said nozzles are positioned to direct a stream of fluid on the straddle area of a fowl.

7. A vaporizing apparatus for the processing of fowl comprising:

a housing, a conveyor in said housing defining a predetermined path and carrying shackle means for suspending fowl in a spaced relationship therealong, said predetermined path including curved portions for changing the direction of travel of the conveyor, turn wheel means mounted in said housing at said curved portion of said predetermined path for counteracting radial forces exerted on said conveyor and for assisting the travel of said conveyor through said curved portions, said turn wheel means angularly displaced at a rate proportional to the rate of travel of said conveyor, a plurality of nozzles separated by distances corresponding to said spaced intervals mounted on a continuous displaceable member, said member mounted for travel about a predetermined circuit and positioned at said curved portion, conduit means for supplying a fluid to said nozzles from a source of fluid, a means for synchronizing the horizontal displacement of said nozzles with the horizontal displacement of fowl on said conveyor, said nozzles oriented to direct a stream of fluid toward a preselected localized portion of said fowl on said conveyor.

8. The vaporizing apparatus of claim 7 wherein said continuous displaceable member comprises a wheel member having fluid passages therein, said member rotatably mounted in dependence upon the rotation of said turn wheel means, said fluid passages communicating between said nozzles and said conduit means.

9. The apparatus of claim 7 wherein said apparatus additionally comprises a plurality of said nozzles corresponding to each of said spaced intervals positioned to direct a fluid stream toward a plurality of preselected localized portions of said fowl.

10. The apparatus of claim 6 wherein said wheel member comprises a circular plate having a chamber located in the center thereof for receiving fluid from said conduit means, said nozzles located at the periphery thereof, said passages in said plate communicating between said nozzles and said chamber.

11. The apparatus of claim 7 wherein said nozzles are oriented to direct a stream of fluid toward the straddle area of said fowl.

12. The apparatus of claim 10 wherein the apparatus further includes a hollow shaft on which said turn wheel means is journaled, said conduit means for supplying fluid comprising a conduit connected at one end to said circular plate, the interior of which communicates with said chamber, said conduit extending through said hollow shaft to a point on the opposite side of said turn wheel means, coupling means attached to said shaft at said point for connecting said conduit to a source of fluid, and the apparatus further comprising a bracket connected to said turn wheel means and said conduit for rotating said conduit in response to the rotation of said turn wheel means, thereby rotating said circular plate.

* * * * *